June 8, 1954     W. E. HORROCKS     2,680,384
PEDAL
Original Filed Nov. 29, 1949     2 Sheets-Sheet 1
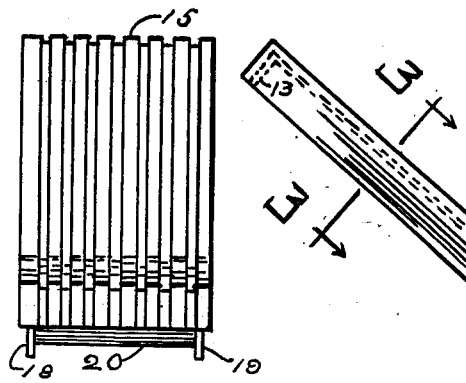
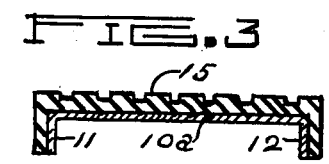
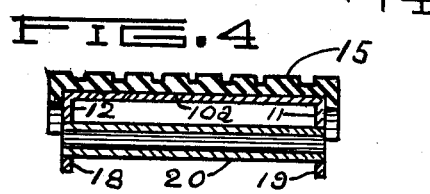
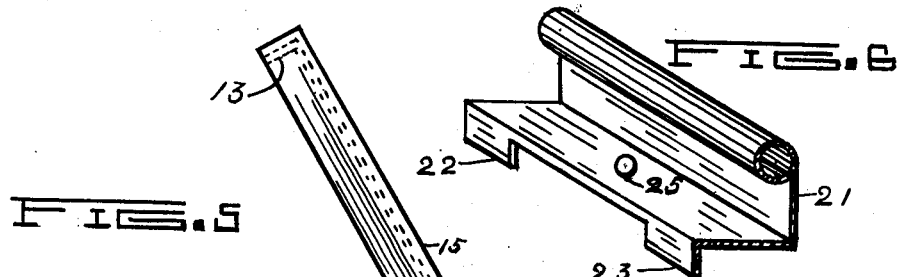
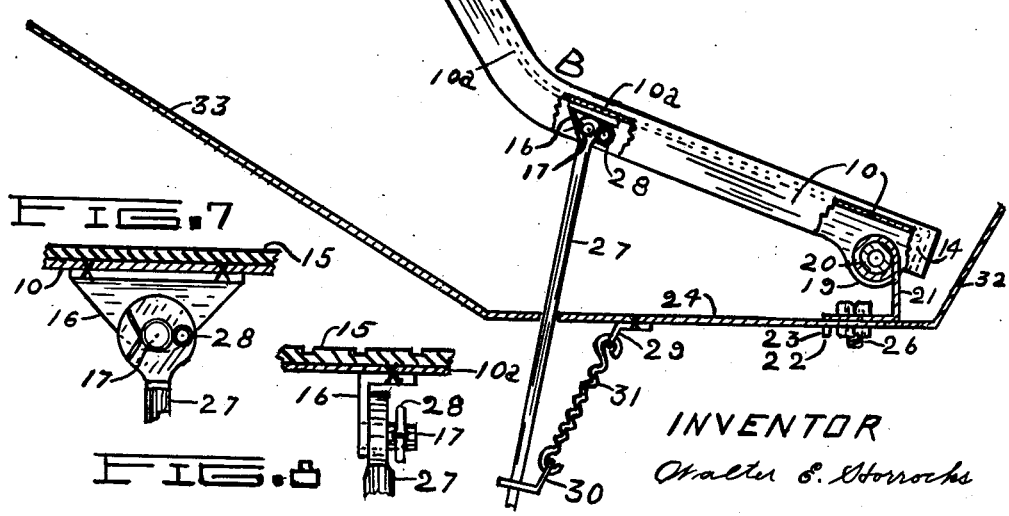
INVENTOR
Walter E. Horrocks

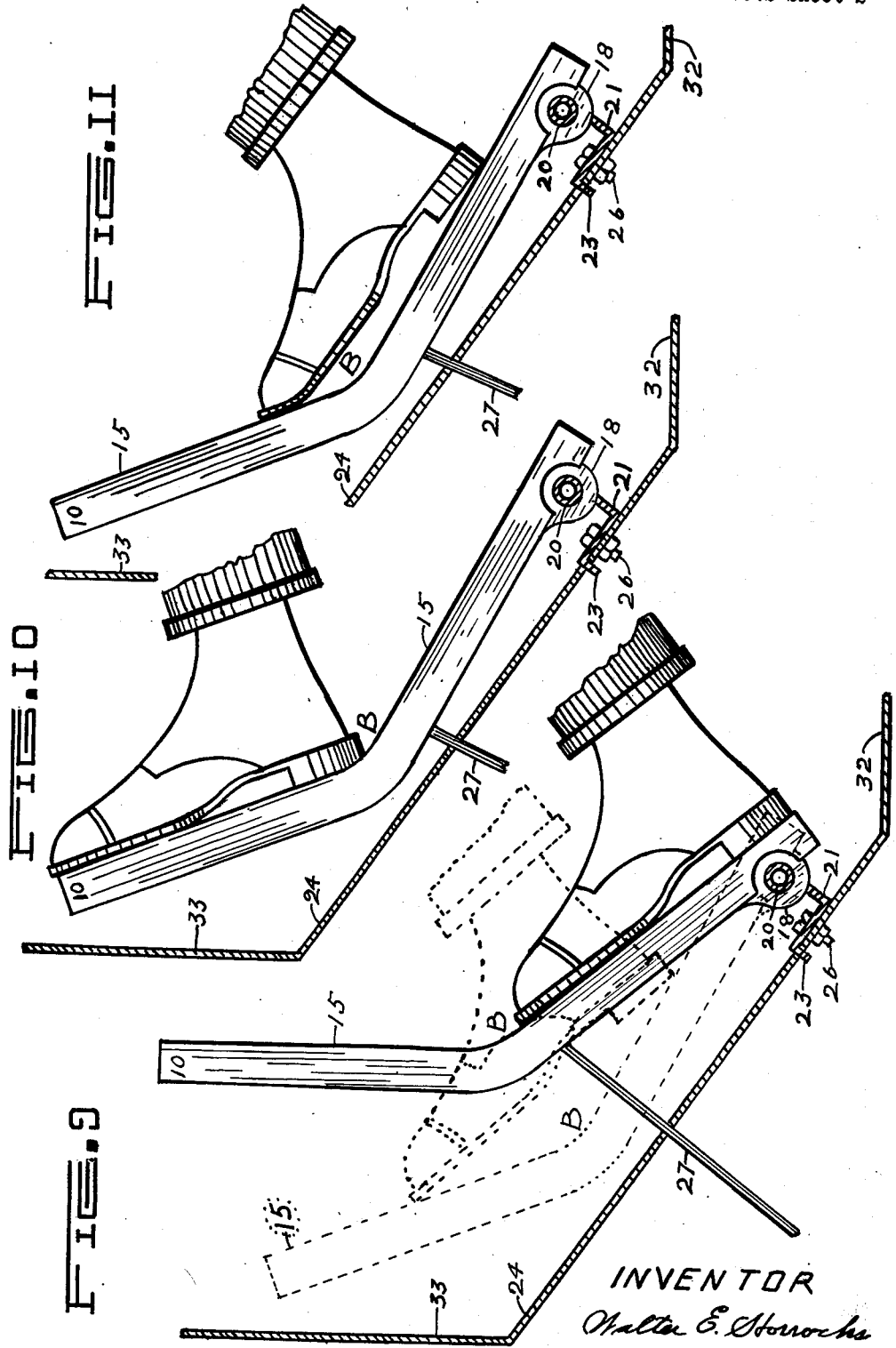

Patented June 8, 1954

2,680,384

UNITED STATES PATENT OFFICE 2,680,384

PEDAL

Walter E. Horrocks, Lakewood, Ohio

Continuation of application Serial No. 130,028, November 29, 1949. This application August 7, 1952, Serial No. 303,089

11 Claims. (Cl. 74—560)

My invention relates to improvements in pedals, such as are used in automobiles and the like.

Experience has shown that in using the conventional type of accelerator pedal in retractive mechanism such as is used in automobiles for controlling the gas feed, it is customary to position the foot in a flat position on the top surface of the pedal structure to depress the pedal in a downward direction by applying pressure principally to the upper end of the pedal with the toe and ball of the operator's foot. This tilting motion of the foot requires a constant flexing of the operator's ankle joint, heel and instep muscles, due to the variable foot pressures that are required for depressing the accelerator pedal downward for supplying the proper amount of gas to accommodate the various desired speed requirements in operating automobiles. When it is desired to depress the pedal to its full downward limit, or its near vicinity for any continuous length of time, such as is the practice that is required in trucking and continuous cross country driving, and for supplying sufficient gas for operating an automotive engine while pulling heavy loads, leg fatigue results, which principally is caused by continually stretching and contracting the large common tendon which controls the muscles of the calf, tendo-achillis, which is attached to the back of the heel bone, and is flexed when the foot is manipulated about the ankle joint in a tilting motion which causes the leg muscles of the operator to become repeatedly stretched and strained, especially in the calf and in the instep, thereby causing leg fatigue and nervous tension.

In order to minimize the straining of leg and foot muscles and thereby reduce the nervous tension of the operator under the driving conditions as outlined above, I have shown a practical embodiment of my invention in which the unitary obtuse angular configuration on the upper working surface of the pedal is designed so that the operator's foot is to be advanced upward in a sliding movement on the upper working surface of the pedal structure in a substantially natural position so as to depress the accelerator pedal to its extreme downward limit while at the same time the toe and the heel of the operator's foot has a resting support on the upper surface of the pedal structure without resorting to the necessity of excessively flexing the ankle joint to depress the pedal downwardly, and the functional requirements for operating the pedal, if so desired, may be shifted principally to the heel, or the heel and toe combined, and the knee joint of the operator which is supported by the thigh is flexed which allows the leg to push the foot in a sliding upward movement along the upper arcuate surface of the accelerator pedal.

The natural position of the foot being assumed to be at right angles to the leg and the foot being assumed to be shod.

An important object of the invention is to provide a pedal that will reduce to a minimum the flexing of the tendo-achillis tendon in the calf of the leg.

Another object is to provide a pedal that will support the foot in a natural position at variable locations thereon.

Another object of the invention is to provide a pedal that will support the foot in a natural position while the pedal is being depressed.

Other objects and advantages of the invention will be apparent during the course of the following description.

In the accompanying drawings forming a part of this specification and in which like numerals are employed to designate like parts throughout the same, Fig. 1 is a front view of a pedal looking in the direction indicated at F in Fig. 2 embodying the features of the present invention, Fig. 2 is a side view of the pedal of Fig. 1 with portions broken away to show the connecting coupling elements, Fig. 3 is a cross section on line 3—3 of Fig. 2, Fig. 4 is a cross section on line 4—4 of Fig. 2 showing the pedal hinge, Fig. 5 is a tilted side view partially in section with portions broken away for showing the pedal attached to the supporting coupling hinge on the toe board and being coupled to a retractive element, Fig. 6 is a perspective view of the hinge portion which anchors the pedal to the toe board, Fig. 7 is an enlarged side view showing the bracket coupling element coupling the retractive element thereto, Fig. 8 is an end view of the bracket shown in Fig. 7, Fig. 9 shows a side view of the pedal and retractive element, with the supporting structures being shown in section, and with the foot being shown in a conventional position by the full lines.

Fig. 10 shows a side view of the pedal being maintained in a fully depressed position by the weight of the foot without unduly flexing the tendo-achillis tendon and straining the muscles of the calf, with the supporting structures being shown in section and, Fig. 11 shows a side view of the pedal in a depressed position with the foot being advanced upward on the surface of the pedal for increasing the leverage action and minimizing the flexing of the common tendon and muscles of the calf, with the supporting elements being shown in section.

Referring now to the drawings, a pedal embodying the invention and particularly adapted for use as an automobile accelerator control is illustrated. In the preferred construction shown, the pedal has a body portion 10 of unitary, box or channel-like construction, having a top or backing plate 10a with depending side flanges 11, 12 and end flanges 13, 14. The upper surface of the top plate of the body 10 forms the working or upper surface of the pedal. This upper side is flat in transverse section, as shown in Fig. 3, to prevent sidewise slipping of an operator's foot, and is rectangular in shape. If desired, the top plate, and also the outside surfaces of the flanges, may be provided with a non-slip covering 15, such as a longitudinally ribbed rubber covering or other suitable material.

To permit actuating movement of the pedal, hinged mounting means are provided adjacent the rear or heel end of the pedal for vertical swinging movement of the forward end of the pedal. In the present instance, the mounting means is of hinge type having a stationary portion or support and a movable portion. The stationary support is an L-shaped member 21 having a horizontal leg with an aperture 25 adapted to receive a fastener, such as a bolt assembly 26, for holding the support to a floor or toe board 24 of an automotive vehicle. Horizontal twisting of the support 21 is prevented by a pair of depending lugs 22, 23 on the forward end of the horizontal leg which are adapted to be received in mating transverse slits in the floor or toe board 24. A loop formed by curving the upper end portion of the upright leg of the support member 21 forwardly is provided to receive a transverse hinge or pivot pin 20. The latter preferably is of tubular construction.

The movable portion of the hinge comprises depending ears or lugs 18, 19 mounting integrally with the side flanges 12, 11, respectively, adjacent the rear end of the pedal body 10. Alined apertures in the ears 18, 19 are provided to receive the end portions of the pivot pin 20. Lateral displacement of the pin 20 is prevented either by providing a press fit between the pin and the loop support member 21 or by peening over the ends of the pin 20 against the outside faces of the ears 18, 19.

To couple the pedal to a control element or actuator, a coupling bracket means is provided on the pedal body 10. In the exemplary construction, a bracket 16, having a horizontal leg securely fastened to the bottom side of the top plate 10a as by spot welding, has a dependable or vertical leg carrying a transversely projecting stud 17. The bracket is positioned slightly to the rear of the center of the illustrated pedal and slightly to one side of the longitudinal axis of the pedal so that the center of the stud 17 is on the axis.

The control element or actuator illustrated is a retractive element or rod 27 extending vertically through an aperture in the floor or toe board 24. The upper end of the rod 27 is flattened and apertured to pivotally engage the stud 17 of the bracket 16. A cotter pin 28 inserted through a hole in the outer end of the stud 17 serves to hold the rod 27 on the stud. The lower end of the retractive rod 27 is connected to a retractile spring 31 by an adjustable clip or bracket 30. The upper end of the spring 31 is fastened to the floor board 24 by a bracket 29, so that the retractive element 27 and the pedal 10 are resiliently biased or urged upwardly. Adjustment of the clip 30 along the retractive element 27 varies the amount of the upward resilient force.

The body of the pedal is constructed such that an operator may actuate the pedal without flexing his ankle joint and at the same time having his foot supported during actuation in its natural position relative to the operator's leg. In accomplishing this, the upper surface of the pedal body 10 is a smooth, uninterrupted and continuous surface to permit the foot of an operator to slide easily forwardly and rearwardly on the pedal body. This forward and rearward movement of the foot along the length of the pedal provides the actuation of the pedal. Support for the foot to maintain it in a substantially natural position is accomplished by arcuately curving or bending upwardly the forward portion of the pedal relative to the rear portion of the pedal at the point indicated by the letter B. The upward curving is of an amount to provide an obtuse angle between the forward and rear portions of the pedal surface. In the preferred embodiment of the invention the angle is in the neighborhood of 120 to 150 degrees.

The upper surface of the pedal is preferably substantially longer than the length of the operator's foot, the latter being around 6 to 15 inches, depending upon the operator's sex, or size, to allow the desired longitudinal movement of the foot along the pedal body. In the illustrated embodiment, the length of the upper surface of the pedal is about twice the length of the operator's foot and the point of curvature is positioned approximately midway of the length of the upper surface such that the forward and rearward portions are substantially equal in length.

Figures 9, 10, and 11 show various positions of the pedal obtainable by the various sliding positions of the foot without excessive flexing of the ankle joint and instep muscles in which Fig. 9 shows in full lines the position of the pedal in relation to the toe board 24 and the bulk head 33 as when the pedal is in a retractive position, with the foot being positioned on the pedal in the conventional manner as shown on the lower portion of the pedal. The dotted lines indicate the position of the pedal such as when it is depressed against the toe board 24 by sliding the foot upwardly with the heel and the toe of the foot being simultaneous supported in a substantially natural position by the arcuate surface of the pedal. It is to be noted that the foot can be advanced upward on the arcuate working surface of the pedal in an unobstructed sliding line of travel from the bottom end to the top end of the pedal structure without raising the heel or the toe from the top surface of the pedal structure, with the toe and the heel always being supported simultaneously at various positions on the surface of the pedal structure without unduly flexing the ankle joint and instep muscles, or contracting the heel muscles, and in which the heel and toe are allowed to remain in sliding contact simultaneously, on the upper surface of the pedal. Figure 10 shows the position of the operator's foot disposed in a substantially natural position on the top portion of the pedal with the full support of the foot being provided by the upper arcuated surface of the pedal and which allows of the operator to fully depress the pedal without unduly flexing the ankle joint and instep muscles which results in minimizing the flexing of the tendo-achillis tendon, and avoids straining the muscles of the calf. This feature also allows the operator to let his foot rest upon the upper portion of the pedal to hold the pedal down due to the increased leverage action which is attained by the configuration of the pedal structure, and it also results in greatly eliminating the nervous tension of the operator by eliminating their leg fatigue, such as when required to keep the pedal in a completely downward position for an extensive period such as is required while climbing long steep grades in which the accelerator pedal must be maintained in its extreme downward position. Fig. 11 shows the position of the operator's foot positioned on the pedal in which the toe is slightly curved, and a slight flexing of the toes within the shoe will tend to deflect the accelerator pedal with very little effort without the necessity of moving the foot, due to the leverage action that is attainable by the configuration of the pedal.

It is to be noted that the Figures 9, 10, and 11 illustrate the shod foot of a male operator but attention is directed to the fact that the configuration that is disclosed will allow of a female operator (in which it is customary for the heels of their shoes to be built up considerably higher, including heels of the spiked design) to operate the accelerator in a more comfortable manner with their heel being placed upon the lower portion of the pedal and the toe contacting the upper portion of the pedal which results in adjusting their foot towards a more natural position and eliminating the usual custom of placing the high heel on the floor board 32 to lessen the excessive stretching of the instep muscles and the contracting of the heel muscles when depressing the accelerator pedal downward. This change allows of a more sensitive response of the pedal with a minimum amount of effort which is not obtainable with the conventional flat type of pedal.

I have shown the invention in connection with a retractive mechanism such as is used in automobile equipment but the invention is intended to be used in any retractive mechanism wherever it is applicable including attaching the pedal structure to the top side of flat top pedals used in retractive mechanisms. It is also to be noted that I have shown simple designs of coupling means in order to describe the invention, but it is intended that other types of coupling elements may be used to make the couplings so that the pedal portion may also be used as a replacement in present mechanisms, such as for illustration, the substituting of ball and socket types of coupling elements that will couple with existing mechanisms, in lieu of the coupling means shown herewith only for descriptive purposes. It is also contemplated that the channel structure shown herewith for descriptive purposes may be inverted so as the top side may hold a moulded composition to provide the arcuated working surface of the pedal, and the upper working surface may be provided by a smooth flat arcuated surface to provide the configuration herewith disclosed for relieving foot fatigue when depressing the pedal as outlined above.

It is to be understood that the form of my invention herewith shown and described is to be taken as to a practical working example of the same, and that various changes in the shape, size, and arrangement of parts, may be resorted to without departing from the spirit or the concept of the invention or the scope of the subjoined claims, and I reserve the right to the use of various metals, alloys, or compositions for making the pedals without departing from the scope of the appended claims.

This application is a continuation of my copending application, Serial No. 130,028, filed November 29, 1949, for Pedal, which application will now be permitted to lapse without prejudice, in view of its being superseded by this present application.

Having described my invention, what I desire to secure by Letters Patent is as follows in which I claim:

1. A mechanism comprising in combination, a supporting structure provided with coupling means, a retractive element provided with coupling means, a pedal structure provided with two coupling means, one end of the pedal structure being coupled by one of its coupling means to the coupling means of the supporting structure and being coupled to the coupling means of the retractive element by its other coupling means, said pedal structure comprising relatively diverging upper surface portions providing an obtuse angular formation at the top side thereof, said pedal structure further comprising side edges bent downwardly from the said upper surface portions.

2. A mechanism comprising in combination, a supporting structure provided with coupling means, a pedal structure provided with coupling means, one end of the pedal structure being coupled by its coupling means to the coupling means of the supporting structure, a retractive element associated with said pedal structure, said pedal structure comprising relatively diverging upper surface portions providing an obtuse angular formation at the top side thereof, said pedal structure further comprising side edges bent downwardly from the said upper surface portions, said retractive element and pedal structure coacting at a point on the pedal structure located at a relatively short distance from the vertex of said obtuse angular formation, on the side thereof, toward said one end of the pedal structure.

3. A pedal structure for actuating an upwardly biased control mechanism comprising in combination, a backing plate having a smooth upper surface free of depressed extensions or upturned projections, to permit forward and rearward sliding of the operator's foot and being curved upwardly at a point forward from its rear and a distance substantially equal to the length of an operator's foot, said curvature being of an amount sufficient to provide an obtuse angle between the portions of said plate forward and rearward of said angle, hinged mounting means for permitting vertical swinging movement of the forward portion of said backing plate, and coupling means adjacent said point of curvature for transmitting the movement of said pedal to said control mechanism.

4. A pedal structure for use with an actuator resiliently biased in an upward direction comprising in combination, a body having a substantially smooth upper surface free from depressed extensions or upturned projections, to permit longitudinal sliding movement of an operator's foot over the length of said upper surface, said upper surface being substantially longer than the length of the operator's foot and having the forward portion thereof bent upwardly relative to the rear portion to form an obtuse angle between said portions, means adjacent the rear of said body for hinge mounting said pedal for vertical swinging movement of the forward end of said pedal, and means on the lower side of said pedal for attaching to said actuator.

5. A pedal structure for use with a resiliently, upwardly biased actuator comprising in combination a body portion having an upper surface including a forward portion and a rearward portion, said upper surface being a smooth uninterrupted surface free from depressed extensions or upturned projections, and having said forward portion curved upwardly relative to said rear portion to form an angle therebetween of 120 to 150 degrees, said forward and rear portions each having a length substantially equal to that of an operator's foot, means adjacent the rear end of said rear portion for mounting said body portion for vertical swinging movement, and means on the lower side of said body portion for coupling the latter to said actuator.

6. A pedal structure for use with a resiliently, upwardly biased actuator comprising in combination a body portion having an upper surface including a forward portion and a rearward portion, said upper surface being a smooth uninterrupted surface free from depressed extensions or upturned projections, and having said forward end portion curved upwardly relative to said rear portion such that an obtuse angle is formed between said portions, said forward and rear portions each having a length substantially equal to that of an operator's foot, means adjacent the rear end of said rear portion for mounting said body portion for vertical swinging movement, and means on the lower side of said body portion for coupling the latter to said actuator.

7. A pedal structure comprising a one piece continuous channel shaped body structure having a flat upper surface free from depressed extensions or upturned projections, to permit forward and rearward sliding of the operator's foot and being curved upwardly at a point forward from its rear end a distance substantially equal to the length of an operator's foot, said curvature being of an amount sufficient to provide an obtuse angle between the portions of said pedal structure forward and rearward of said angle.

8. A pedal structure as described in claim 7, including a rubber covering over the top and sides of said pedal structure, and means for attaching said pedal structure to supporting elements.

9. A pedal structure comprising a one piece body structure having a flat upper surface free from depressed extensions or upturned projections with a rubber covering over the said surface arranged to permit forward and reaward sliding movement of the operator's foot and being curved upwardly at a point forward from its rear end a distance substantially equal to the length of an operator's foot, said curvature being of an amount sufficient to provide an obtuse angle between the portions of said pedal structure forward and rearward of said angle.

10. A pedal structure as described in claim 9 including hinged supporting means adjacent the lower end of said body, and coupling means on the underside of said body spaced forwardly from its rear end.

11. A pedal structure comprising a one piece body structure free from any centrally located reinforcing web and providing an upper working surface free from any depressed extensions or upturned projections and being curved upwardly at a point forward from its rear end a distance substantially equal to the length of an operator's foot, said curvature being arranged in a manner to provide the upper working surface of the said pedal with means to support an operator's foot in substantially natural positions when sliding their foot forward and rearward on the said working surface of said pedal.

References Cited in the file of this patent

UNITED STATES PATENTS

| Number | Name | Date |
|---|---|---|
| 968,750 | Dunham | Aug. 30, 1910 |
| 1,203,955 | Adams | Nov. 7, 1916 |
| 1,468,571 | McGinley | Sept. 18, 1923 |
| 1,522,401 | West | Jan. 6, 1925 |
| 2,484,592 | Rodd | Oct. 11, 1949 |
| 2,532,189 | Pinardi | Nov. 28, 1950 |

FOREIGN PATENTS

| Number | Country | Date |
|---|---|---|
| 4,343 | Germany | Feb. 26, 1878 |

OTHER REFERENCES

Adams: "Pedal and Foot Operated Levers, III," Product Engineering, page 322, July 1940.